(12) United States Patent
Zhang et al.

(10) Patent No.: US 10,748,687 B2
(45) Date of Patent: Aug. 18, 2020

(54) METHODS OF MAKING A COMPONENT WITH VARIABLE MAGNETIZATION AND RELATED COMPONENTS

(71) Applicant: GENERAL ELECTRIC COMPANY, Schenectady, NY (US)

(72) Inventors: Wanming Zhang, Clifton Park, NY (US); Min Zou, Niskayuna, NY (US); Francis Johnson, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 166 days.

(21) Appl. No.: 15/918,359

(22) Filed: Mar. 12, 2018

(65) Prior Publication Data

US 2019/0279795 A1    Sep. 12, 2019

(51) Int. Cl.

| H01F 1/14 | (2006.01) |
|---|---|
| H01F 1/147 | (2006.01) |
| H01F 41/02 | (2006.01) |
| H02K 1/02 | (2006.01) |
| H02K 1/06 | (2006.01) |
| H02K 15/02 | (2006.01) |
| H02K 1/24 | (2006.01) |
| H01F 1/18 | (2006.01) |
| H01F 3/02 | (2006.01) |
| H01F 3/10 | (2006.01) |

(52) U.S. Cl.
CPC .............. H01F 1/147 (2013.01); H01F 1/18 (2013.01); H01F 3/02 (2013.01); H01F 41/02 (2013.01); H01F 41/0233 (2013.01); H02K 1/02 (2013.01); H02K 1/06 (2013.01); H02K 1/246 (2013.01); H02K 15/02 (2013.01); H01F 2003/106 (2013.01)

(58) Field of Classification Search
CPC ......... C23C 14/04; C23C 16/04; C23C 10/04; C23C 8/04; H01F 1/147; H01F 41/02; H02K 1/06; H02K 15/02
See application file for complete search history.

(56) References Cited

U.S. PATENT DOCUMENTS

| 6,322,640 | B1 | 11/2001 | Xiao et al. |
|---|---|---|---|
| 6,509,267 | B1 | 1/2003 | Woo et al. |
| 7,041,595 | B2 | 5/2006 | Chopra |
| 8,920,581 | B2 * | 12/2014 | Natori ...................... C21D 1/76 148/232 |
| 9,634,549 | B2 | 4/2017 | Dial et al. |
| 2002/0142583 | A1 | 10/2002 | Chopra |
| 2011/0266893 | A1 | 11/2011 | El-Refaie |
| 2014/0265708 | A1 | 9/2014 | Galioto et al. |
| 2015/0295454 | A1 | 10/2015 | El-Refaie et al. |
| 2015/0332823 | A1* | 11/2015 | Sakurai ................... H01F 1/147 75/244 |
| 2016/0087503 | A1 | 3/2016 | Galioto et al. |
| 2016/0203898 | A1 | 7/2016 | Johnson et al. |
| 2016/0203899 | A1 | 7/2016 | Zou et al. |
| 2017/0183764 | A1 | 6/2017 | Dial et al. |

FOREIGN PATENT DOCUMENTS

JP    2015053823 A    3/2015

OTHER PUBLICATIONS

Yoon et al., "Investigation of RuTiN and RuTiO Diffusion Barrier Suggested by a New Design Concept for Future High-Density Memory Capacitors", IEEE Electron Device Letters, http://ieeexplore.ieee.org/document/992829/, vol. 23, Issue 04, pp. 176-178, Apr. 2002.

Elers et al., "Diffusion Barrier Deposition on a Copper Surface by Atomic Layer Deposition", Chemical Vapour Decomposition, http://onlinelibrary.wiley.com/doi/10.1002/1521-3862(20020704)8:4%3C149::AID-CVDE149%3E3.0.CO;2-F/full, vol. 08, Issue 04, pp. 149-153, Jul. 2002.

Dixit et al., "Structural and Electronic Properties of a Mn Oxide Diffusion Barrier Layer Formed by Chemical Vapor Deposition", IEEE Transactions on Device and Materials Reliability, http://ieeexplore.ieee.org/abstract/document/5749279/, vol. 11, Issue 02, pp. 295-302, Jun. 2011.

Extended European Search Report for corresponding European Patent Application No. 18215696.8-1212 dated Jul. 5, 2019 (6 pages).

Gregory Marcos et al. "Stainless steel patterning by combination of micro-patterning and driven strain produced by plasma assisted nitriding" Surface & Coatings Technology 205 (2011) S275-S279, Jan. 20, 2011 (5 pages).

Sharma Shashank al. "Selective plasma nitridation and contrast reversed etching of silicon" 2001 American Vacuum Society (4 pages).

* cited by examiner

Primary Examiner — Jessee R Roe
(74) Attorney, Agent, or Firm — Christopher R. Carroll; The Small Patent Law Group LLC (57) ABSTRACT

A method of forming a component having a variation in saturation magnetization is presented. The method includes selectively diffusing nitrogen into a metallic component of a masked metallic component by exposing the masked metallic component to a nitrogen-rich atmosphere. The masked metallic component includes a patterned oxide layer formed on a surface of the metallic component, and the patterned oxide layer includes an oxide of a metal present in the metallic component. A related component is also presented.

20 Claims, 7 Drawing Sheets

FIG. 8

METHODS OF MAKING A COMPONENT WITH VARIABLE MAGNETIZATION AND RELATED COMPONENTS

STATEMENT REGARDING FEDERALLY SPONSORED RESEARCH & DEVELOPMENT

This invention was made with Government support under contract number DE-EE0007755, awarded by the United States Department of Energy. The Government has certain rights in the invention.

BACKGROUND

Embodiments of the present disclosure relate generally to components with variable magnetization. More particularly, the disclosure relates to methods of making components with variable magnetization using selective nitrogenation and the components made thereof.

Magnetic materials used in electric machines generally serve multiple functions. For example, they may provide efficient coupling of magnetic fluxes to complementary poles across an air gap in the electric machines. Soft magnetic materials of the magnetic components may also bear a significant fraction of the mechanical and structural loads of the electric machine. Sometimes, there may be tradeoffs between efficient magnetic utilization of the material and mechanical load bearing capability of the magnetic materials. Therefore, it is desirable to have a material that can avoid the trade-offs between efficiency and operability of the electric machines by locally controlling the magnitude of the saturation magnetization of the soft magnetic material, used in electric machines.

A range of ferrous based soft magnetic compositions may be austenitized by a combination of processes to form regions of low permeability and saturation magnetizations. Characteristics of these materials can be changed by doping or otherwise selectively introducing species into the materials, for example, nitrogen. Selective nitrogenation of the magnetic materials is typically achieved by using ceramic masks. However, ceramic masks may pose several technical and process challenges. For example, stresses may be generated at the interfaces between the ceramic masks and the magnetic components, ceramic masks may require multiple and complex deposition steps, and the ceramic masks typically require removal of the ceramic barrier layers after the nitrogenation, which can add complexity and cost to the overall process. Further, ceramic masks may be difficult to remove, and typically involve chemical and/or mechanical etching of the mask, which can damage the underlying material. Thus, there is a need for improved methods of selective nitrogenation of magnetic materials.

BRIEF DESCRIPTION

In accordance with one aspect of the disclosure, a method of forming a component having a variation in saturation magnetization is presented. The method includes selectively diffusing nitrogen into a metallic component of a masked metallic component by exposing the masked metallic component to a nitrogen-rich atmosphere. The masked metallic component includes a patterned oxide layer formed on a surface of the metallic component, and the patterned oxide layer includes an oxide of a metal present in the metallic component.

In accordance with one aspect of the disclosure, a method of forming a component having a variation in saturation magnetization is presented. The method includes forming an oxide layer on a surface of a metallic component, wherein the oxide layer includes an oxide of a metal present in the metallic component. The method further includes patterning the oxide layer to form a masked metallic component including a patterned oxide layer. The method furthermore includes heat-treating the masked metallic component in a nitrogen-rich atmosphere to form a first region and second region in the metallic component, wherein the first region and the second region are characterized by a nitrogen content that is different from each other, and a saturation magnetization value that is different from each other.

In accordance with another aspect of the disclosure, a component is including a metallic component and a patterned oxide layer disposed on a surface of the metallic component is presented. The patterned oxide layer includes an oxide of a metal present in the metallic component, and the metallic component is characterized by a variation in nitrogen content and a variation in saturation magnetization values in different regions of the metallic component.

BRIEF DESCRIPTION OF THE DRAWINGS

These and other features, aspects, and advantages of the present disclosure will become better understood when the following detailed description is read with reference to the accompanying drawings, in which like characters represent like parts throughout the drawings, wherein.

DETAILED DESCRIPTION

Approximating language, as used herein throughout the specification and claims, may be applied to modify any quantitative representation that could permissibly vary without resulting in a change in the basic function to which it is related. Accordingly, a value modified by a term or terms, such as "about", and "substantially" is not to be limited to the precise value specified. In some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

As used herein, the terms "coating" and "layer" refer to a material disposed on at least a portion of an underlying surface in a continuous or discontinuous manner. Further, the terms "coating" and "layer" do not necessarily mean a uniform thickness of the disposed material, and the disposed material may have a uniform or a variable thickness. The term "coating" may refer to a single layer of the coating material or may refer to a plurality of layers of the coating material. The coating material may be the same or different in the plurality of layers.

As used herein, the term "disposed on" refers to layers or coatings disposed directly in contact with each other or indirectly by having intervening layers there between, unless otherwise specifically indicated. The term "depositing on" refers to a method of laying down material in contact with an underlying or adjacent surface in a continuous or discontinuous manner. The term "adjacent" as used herein means that the two materials or coatings are disposed contiguously and are in direct contact with each other.

As used herein, the term "magnetic region" refers to a region where greater than about 99 volume % of the region is magnetic. Further, the term "magnetic region" refers to a region having a relative permeability greater than 1. In some embodiments, the relative permeability of the magnetic region may be greater than 100, and in some embodiments, the relative permeability of the magnetic region may be greater than 200. In some embodiments, a saturation magnetization of the magnetic region is greater than 1.5 Tesla. In certain embodiments, a saturation magnetization of the magnetic region is greater than 1.8 Tesla.

As used herein, the term "non-magnetic region" refers to a region where greater than 90 volume % of the region is non-magnetic. Further, the term "non-magnetic region" refers to a region having a relative permeability approximately equal to 1. In some embodiments, a saturation magnetization of the non-magnetic region is less than 0.01. In some embodiments, a saturation magnetization of the non-magnetic region is about zero.

As used herein, the term "partially-magnetic region" refers to a region where from about 10 volume % to about 99 volume % of the region is magnetic with a relative permeability greater than 1. In some embodiments, a saturation magnetization of the partially-magnetic phase is in a region from about 0.01 to about 1.5 Tesla. In some embodiments, a saturation magnetization of the partially-magnetic region is in a range from about 0.5 to about 1.5 Tesla.

In the present disclosure, a particular parameter (for example, nitrogen content or a saturation magnetization) for two regions is stated to be different if a difference in the specified value between the two regions is at least 5% of the specified value of any one of the two regions. As used herein, the term "difference" refers to a mathematical difference that would be obtained by subtracting a parameter value of one region (for example, the nitrogen content in the first region 101) from the parameter value of another region (for example, the nitrogen content in the second region 102). Thus, in some embodiments, a nitrogen content in the first region 101 and the nitrogen content in the second region 102 is said to be different if the difference between the nitrogen content of the first region 101 and the nitrogen content of the second region 102 is at least 5% of the nitrogen content of any one of the first region 101 and the second region 102. In some embodiments, a saturation magnetization of the first and second regions is said to be different if the difference between the saturation magnetization of the first region 101 and the saturation magnetization of the second region 102 is at least 5% of the saturation magnetization of any one of the first region 101 and the second region 102.

The term "dimension" as used herein includes any length, width, thickness, any diagonal or non-diagonal directions, and volume. Thus, a parameter is considered to be "graded across a dimension" if the parameter is graded across the length, across the width, across the thickness, across any diagonal or non-diagonal directions, across a volume, or across any designed pattern.

In some embodiments, a method of forming a component having a variation in saturation magnetization is presented. The method includes selectively introducing nitrogen into a metallic component by exposing a masked metallic component to a nitrogen-rich atmosphere. The masked metallic component includes a patterned oxide layer formed on a surface of the metallic component, the patterned oxide layer including an oxide of a metal present in the metallic component. In some embodiments, the component is a magnetic component.

The term "magnetic component", as used herein, refers to any component that reacts with a magnetic field to produce a functional response. These responses include, but are not limited to, a mechanical torque, an electrical potential, and/or a change in temperature. In some embodiments, the magnetic component may be a magnetic component of an electrical machine. Non-limiting examples of a magnetic component include magnetic components (such as, laminates) used in a stator or rotor of an electrical machine. The term "variation in saturation magnetization" as used herein means that the saturation magnetization is different in different portions of the component. This difference in saturation magnetization, as described in detail later, may be discrete across a plurality of regions in the component or may be graded across a region in the component. As mentioned earlier, nitrogen content in a region is associated with a magnetism of that particular region. In some embodiments, the magnetism of a region increases with decreasing nitrogen content in that region. Thus, in accordance with embodiments of the disclosure, a variation in saturation magnetization in a component is achieved by selectively varying the nitrogen content in the component.

Typically, the nitrogen content in the component is varied by employing ceramic materials disposed as patterned masks on the component. The ceramic materials function as a "nitrogen barrier" material, that is, the ceramic material selectively inhibits or reduces the amount of nitrogen that diffuses into certain portions of the component, thereby, varying the nitrogen content and the saturation magnetization across the component. The ceramic-based barrier layers may however pose several technical and process challenges, for example, stresses may be generated at the interfaces between the ceramic layers and the components, ceramic barrier layers may require multiple and complex deposition steps, and the ceramic barrier layers typically require removal of the ceramic barrier layers after the nitrogenation. Embodiments of the disclosure described herein address the noted shortcomings in the art by employing a patterned layer of a metal oxide, grown at least in part from the metal in the component, as a nitrogen barrier layer.

Figure 1:
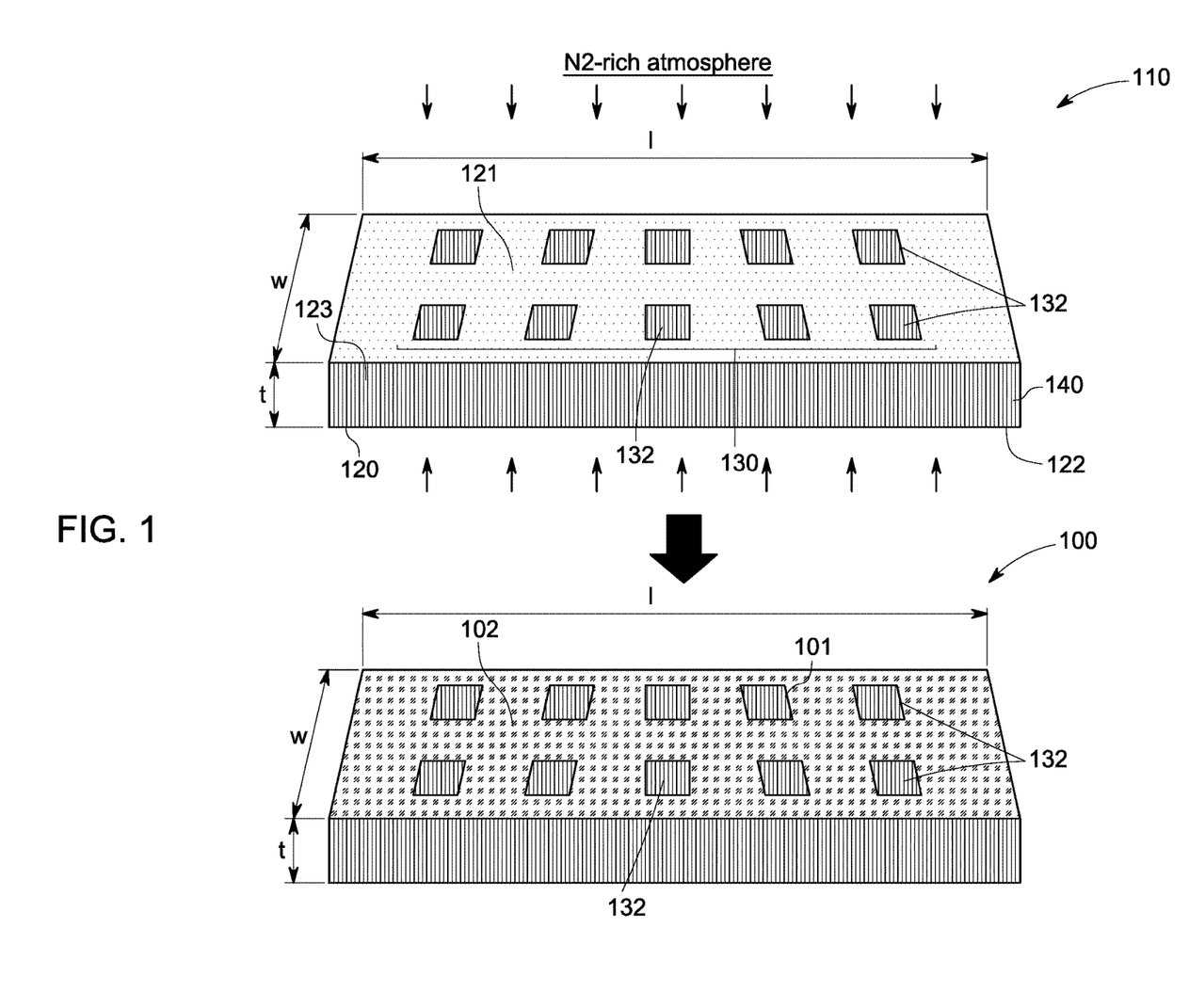
FIG. 1 illustrates side elevation views of a component having a variation in saturation magnetization being formed, via a sequence of steps, in accordance with some embodiments of a method of the disclosure.

Referring now to FIG. 1, side elevation views of a component 100 having a variation in saturation magnetization being formed, via a sequence of steps, in accordance with some embodiments of a method 10 of the disclosure, are illustrated. As shown in FIG. 1, the method 10 includes exposing a masked metallic component 110 to a nitrogen-rich atmosphere to selectively diffuse nitrogen into the metallic component of the masked metallic component 110. The masked metallic component 110 includes a metallic component 120 and a patterned oxide layer 130 formed on the surfaces 121 and 122 of the metallic component 120. The patterned oxide layer includes a plurality of patterned oxide regions 132 formed on the surfaces 121 and 122 of the metallic component 120. In FIG. 1, the side surface 123 further includes an oxide coating 140 disposed on the surface. In the embodiment illustrated in FIG. 1, the oxide coating 140 disposed on the side surface 123 is not patterned to form the patterned oxide layer 130. However, embodiments wherein the oxide coatings on the side surfaces are patterned are also within the scope of the disclosure. As shown in FIG. 1, nitrogen is selectively introduced into the metallic component 120 to form the component 100. The component 100 includes a first region 101 and a second region 102, described in detail later.

It should be noted that FIG. 1 is for illustration purposes only, and the masked alloy component 110 is illustrated as having a rectangular shape of certain length (l), width (w), and thickness (t) only for ease of illustration. Metallic components and corresponding masked metallic components having any suitable geometry and shape are envisaged within the scope of the disclosure. Further, although the size and shape of the patterned oxide regions 132 of the patterned oxide layer 130 are illustrated to be substantially similar, the shape and size of the patterned oxide regions 132 may vary. The patterned oxide layer 130 may be designed such that the different patterned oxide regions 132 may be of the same or different shape. Further, the different patterned oxide regions 132 may have the same or different length (l1), width (w1), and thickness (t1) values, depending on the shape of the metallic component 120 and the end use requirements.

The metallic component 120 may include a single elemental metal, a metal alloy, or a combination thereof. Thermodynamic and empirical calculations may be used to predict metallic component 120 compositions that upon the addition of nitrogen at elevated temperatures form the austenite phase. Conversion of ferrite or martensitic structures into an austenite structure, e.g., by incorporation of nitrogen, increases non-magnetic and partially-magnetic phases in this alloy. In some embodiments, the metallic component 120 includes a metal alloy. In certain embodiments, the metallic component 120 includes an iron-based metal alloy. In some embodiments, the iron-based alloy may further include chromium, manganese, or a combination thereof. In some embodiments, the iron-based alloy may have a ferrite or martensitic structure. In some embodiments, the iron-based includes about 20 weight % chromium and about 5 weight % manganese with the balance being substantially iron. In some embodiments, the chromium and manganese concentrations may be between 14 and 20 weight % and between 2 and 5 weight %, respectively, with the balance being iron. In some embodiments, part of the iron may be substituted with up to 35 weight % cobalt. In some embodiments, part of chromium may be substituted with up to 8 weight % aluminum. In some embodiments, part of the iron may substitute with up to 35 weight % cobalt and part of chromium may be substituted with up to 8 weight % aluminum.

A metallic component 120 of the desired alloy composition may be manufactured using any suitable method. In some embodiments, the metallic component 120, thus manufactured, in a near-final form, is subjected to selective nitrogenation, without the need to substantially alter the shape and size of the formed metallic component 120 after nitrogenation.

As noted previously, the patterned oxide layer 130 includes an oxide of a metal present in the metallic component 120. Therefore, the patterned oxide layer 130 is formed by oxidizing at least a portion of the metallic component 120 such that at least a portion of a metal in the metallic component 120 forms a metal oxide. In some embodiments, the patterned oxide layer 130 includes an oxide of a plurality of metals present in the metallic component 120. In some embodiments, the patterned oxide layer 130 includes a plurality of oxides, each oxide of the plurality of oxides formed from a metal present in the metallic component 120. In some embodiments, the patterned oxide layer 130 includes at least an oxide of iron that is present in the metallic component. In some embodiments, the patterned oxide layer 130 includes at least an oxide of chromium that is present in the metallic component. In some embodiments, the patterned oxide layer 130 includes an oxide of iron and/or an oxide of chromium that is present in the metallic component 120.

The method may further include the step of providing a masked metallic component 110. The term "providing" as used in this context refers to either the step of procuring a pre-fabricated masked metallic component 110 or fabricating the masked metallic component 110 by forming the patterned oxide layer 130 on the metallic component 120. The patterned oxide layer 130 may be formed by either oxidizing the surface of the metallic component 120 followed by selective patterning of the oxide layer, or, by masking selected portions of metallic component 120 followed by selectively oxidizing the surfaces of the unmasked portions of the metallic component 120.

In certain embodiments, the patterned oxide layer 130 is formed by forming an oxide layer on the surface of the metallic component, wherein the oxide layer includes the oxide of a metal present in the metallic component, and selectively patterning the oxide layer.

Figure 2:
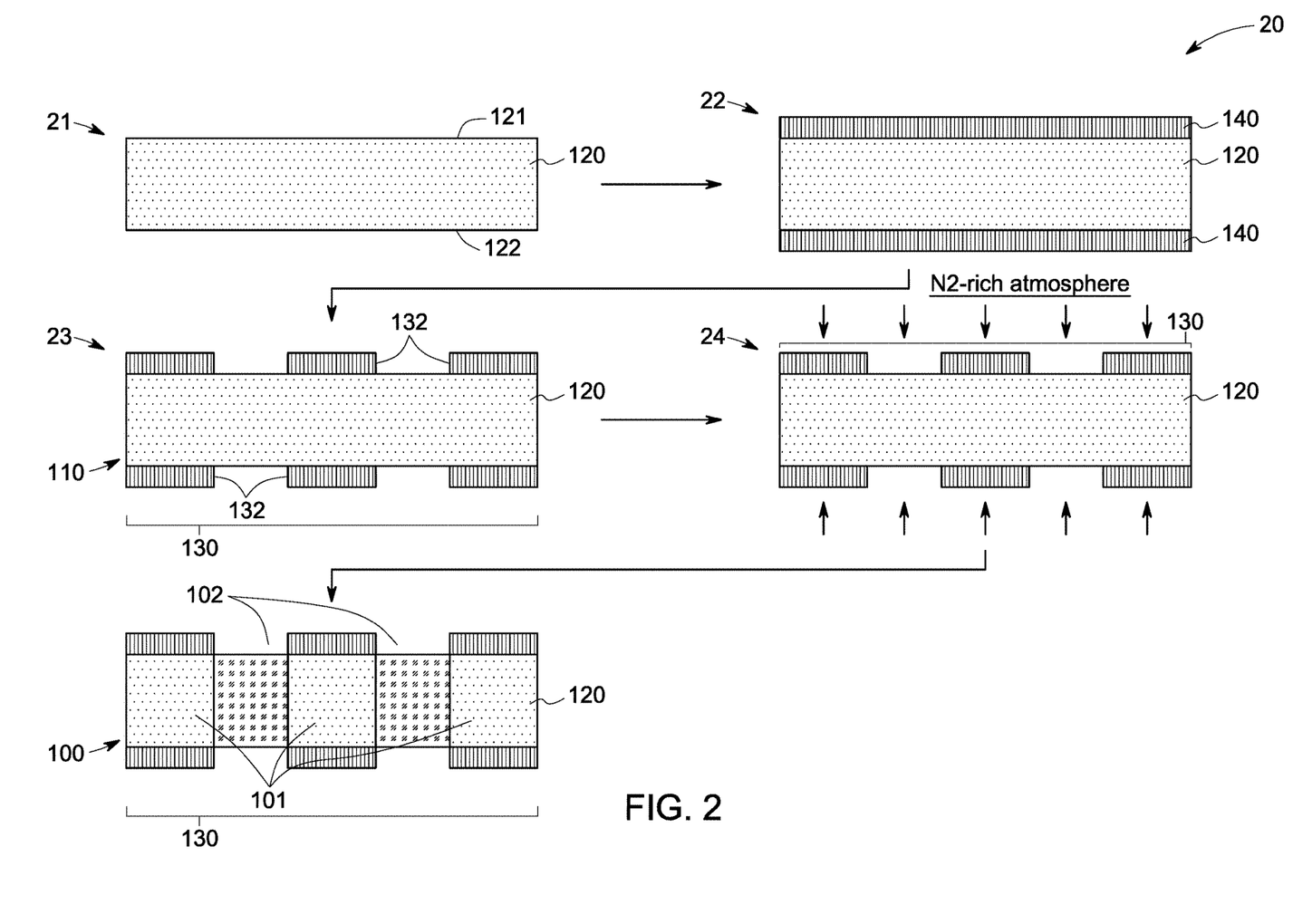
FIG. 2 illustrates side elevation views of a component having a variation in saturation magnetization being formed, via a sequence of steps, in accordance with some embodiments of a method of the disclosure.

Referring now to FIG. 2, side elevation views of a component 100 having a variation in saturation magnetization being formed, via a sequence of steps, in accordance with some embodiments of a method 20 of the disclosure, are illustrated. The method 20 includes, at step 21, procuring or providing a metallic component 120. The method further includes, at step 22, forming an oxide layer 140 on the surfaces 121 and 122 of the metallic component 120. It should be noted that in FIG. 2, although the oxide layer 140 is shown only on surfaces 121 and 122 of the metallic component, embodiments wherein the oxide layer 140 is grown on all the other surfaces (e.g., side faces) are also envisaged within the scope of the disclosure.

As noted previously, the oxide layer 140 includes an oxide of the metal present in the metallic component 120. Non-limiting examples of suitable techniques for forming the oxide layer 140 include thermally treating the metallic component 120, chemically oxidizing the metallic component 120, or a combination thereof. In some embodiments, the oxide layer 140 is formed by chemically oxidizing the surfaces of the metallic component 120. In some such instances, the chemical oxidation of the surfaces may be achieved by contacting the surfaces with a suitable chemical agent. Non-limiting example of a suitable chemical agent includes an acid, for example, citric acid, nitric acid, or a combination thereof.

In some embodiments, the oxide layer 140 is formed by thermally treating the metallic component 120 such that a thermally grown oxide layer 140 forms on the surfaces of the metallic component 120. In certain embodiments, the step 22 of forming the oxide layer 140 includes thermally treating the metallic component 120 at a temperature equal to or greater than 900° C. in the presence of an atmosphere including an oxidant. In certain embodiments, the step 22 of forming the oxide layer 140 includes thermally treating the metallic component 120 at a temperature in a range from about 900° C. to about 1050° C., in the presence of an atmosphere including an oxidant. Non-limiting examples of suitable oxidants include oxygen, air, and the like. In certain embodiments, the atmosphere during the thermal treatment of the metallic component 120 may further include helium, argon, nitrogen, a nitrogen and hydrogen mixture, a hydrogen and steam mixture, or combinations thereof.

Inventors of the present application have found that by controlling the oxidizing conditions of the metallic component 120, such as, the composition of the oxidizing atmosphere, heat treatment temperature, or the time duration of heat treatment, an oxide layer 140 having the desired characteristics of a "nitrogen barrier" layer may be formed. Further, in some embodiments, the patterned oxide layer 130 after the nitrogenation step may not need to be removed before incorporating the component 100 in an electrical machine. In some embodiments, the oxide layer 140 and the subsequent patterned oxide layer 130 is thin enough that it doesn't have to be removed for the end use requirements of the component 100. In some embodiments, the oxide layer 140 has a thickness in a range from about 1 micron to about 50 microns.

Referring again to FIG. 2, the method 20 further includes selectively patterning the oxide layer 140, at step 23, to form the patterned oxide layer 130. The patterned oxide layer 130 is formed on the metallic component 120 to form the masked metallic component 110, as shown in FIG. 2. One skilled in the art would understand that depending on the shape and size of the required magnetic, partially-magnetic, and/or non-magnetic regions in the final component 100, the oxide regions 132 of the patterned oxide layer 130 may be designed to have different shapes and characteristics. Accordingly, at step 23, portions of the oxide layer 140 may be selectively removed by different methods including, but not limited to, etching, grit blasting, and the like. Appropriately designed stencils and/or masks may be used for selective patterning of the oxide layer 140.

As noted previously, diffusion of nitrogen into the component 120 may result in formation of partially-magnetic and/or non-magnetic regions in the component 120. Therefore, at step 23, the oxide layer 120 may be patterned such that regions of the component 120 that are designed to remain magnetic are masked by the oxide regions 132 of the patterned oxide layer 130, such that nitrogen diffusion into these regions is avoided. Further, at step 23, the oxide layer 120 may be patterned such that the regions of the component 120 that are designed to be partially-magnetic or non-magnetic are unmasked during the subsequent nitrogenation step, such that at least some nitrogen diffuses into the component 120 in these regions.

With continued reference to FIG. 2, the method 20 further includes, at step 24, exposing the masked metallic component 110 to a nitrogen-rich atmosphere, thereby forming the component 100. Exposing the masked metallic component 110 to a nitrogen-rich atmosphere such that the nitrogen selectively diffuses into the metallic component 120 is referred to herein as "selective nitrogenation". As noted earlier, the masked metallic component 110 may be subjected to selective nitrogenation by employing the patterned oxide layer 130 as a nitrogen barrier layer. As used herein, the term "selective nitrogenation" refers to the controlled nitrogenation of desired regions of the component, without substantially altering the ferromagnetic nature of the nearby regions. The ferromagnetic nature of a nearby region may be considered to be "substantially altered", if the average saturation magnetization of that region is reduced by more than about 5 volume % of that region.

The selective nitrogenation of the component 120 may be carried out through a solid, liquid, gaseous, or plasma route. In some embodiments, elevated temperature gas nitrogenation is used to introduce nitrogen to the metallic component 120. In certain embodiments, the elevated temperature gas nitrogenation includes heat-treating the masked metallic component 120 in a nitrogen atmosphere at an elevated temperature. Alternately, heat treatment in a mixture of ammonia and hydrogen may be used for nitrogen diffusion. The elevated temperatures in this technique allow for fast diffusion of nitrogen, providing a quicker processing route. In some embodiments, heat treatment in a molten salt bath containing cyanides, cyanates, or a combination thereof may be used for nitrogen diffusion. Therefore, the term "nitrogen-rich atmosphere" as used herein refers to an atmosphere including nitrogen, ammonia, a mixture of ammonia and hydrogen, cyanide, cyanate, or combinations thereof.

In some embodiments, the nitrogen-rich atmosphere includes greater than 90% of nitrogen. In certain embodiments, nitrogenation is conducted in a substantially pure nitrogen atmosphere. The substantially pure nitrogen atmosphere may be created by filling nitrogen in a furnace cavity after evacuating the air from the furnace cavity, and purging with nitrogen or through the continuous flow of nitrogen during processing.

In some embodiments, selective nitrogenation includes heat-treating the masked metallic component 110 in a nitrogen atmosphere at a temperature greater than 700° C. In certain embodiments, selective nitrogenation includes gas nitrogenation the masked metallic component 110 in a nitrogen atmosphere at a temperature greater than 800° C. In some embodiments, the pressure used for gas nitrogenation is greater than 0.5 atmospheres (atm.). In some embodiments, an ambient pressure of greater than 1 atm. and a temperature greater than 900° C. is used for nitrogenation.

When the masked metallic component 110 is exposed to a nitrogen-rich atmosphere, the nitrogen diffuses into the metallic component 110, through the exposed surfaces of the metallic component 110, including the top surface 121 and the bottom surface 122, as shown in FIG. 2. In the embodiment illustrated in FIG. 2, although, the nitrogen diffuses through the top surface 121 and the bottom surface 122, appropriate control of the nitrogenation parameters may allow the nitrogen to diffuse further into the length, width, and thickness of the metallic component 120, through the exposed surfaces of the metallic component 120, while the oxide regions 132 prevent substantial nitrogen diffusion through those regions.

As mentioned previously, the diffused nitrogen, in conjunction with the composition of the component, may change the local phase stability in the nitrogen-diffused regions, and converts these regions into at least partially austenite phase. As the method includes selective introduction of nitrogen to different regions of the metallic component 120, these regions are characterized by a nitrogen content and saturation magnetization that is different from each other.

With continued reference to FIG. 2, the method 20 further includes, at step 24, forming a first region 101 and a second region 102 in the metallic component 120 to form the component 100. The first region 101 and the second region 102 are characterized by a nitrogen content that is different from each other and a saturation magnetization value that is different from each other.

As noted earlier, nitrogen content in a region is associated with a magnetism of that particular region. In some embodiments, the magnetism of a region increases with decreasing nitrogen content in that region. Thus, in some embodiments, a region is magnetic if a nitrogen content of that region is less than 0.1 weight % of that region, and a region is non-magnetic if a nitrogen content of that region is greater than 0.4 weight % of that region. Further, a region is partially-magnetic if a nitrogen content is in a range from about 0.1 weight % to about 0.4 weight % of that region.

In some embodiments, the first region 101 is magnetic and the second region 102 is non-magnetic or partially-magnetic. In some embodiments, the first region 101 is magnetic and the second region 102 is partially-magnetic. In such instances, a nitrogen content of the first region 101 is less than 0.1 weight % of the first region 101, and a nitrogen content of the second region 102 is in the range from about 0.1 weight % to about 0.4 weight % of the second region 102. In some embodiments, the first region 101 is magnetic and the second region 102 is non-magnetic. In such instances, a nitrogen content of the first region 101 is less than 0.1 weight % of the first region 101, and a nitrogen content of the second region 102 is greater than 0.4 weight % of the second region 102.

In some embodiments, the nitrogen content and saturation magnetization in a region are substantially constant across the volume within that region. For example, in some embodiments, a nitrogen content in a magnetic region has a substantially constant value that is less than 0.1 weight % and a saturation magnetization has a substantially constant value that is greater than 1.5 Tesla across the volume of the magnetic region. In some embodiments, a nitrogen content in a non-magnetic region has a substantially constant value that is greater than 0.4 weight % and a saturation magnetization that is about zero across the volume of the non-magnetic region. Further, in some embodiments, a nitrogen content in a partially-magnetic region has a substantially constant value that is in a range from about 0.1 weight % to about 0.4 weight % and a saturation magnetization has a substantially constant value that is in a range from about 0.5 Tesla to about 1.5 Tesla across the volume of the partially-magnetic region.

Thus, in some embodiments, the nitrogen content and the saturation magnetization is substantially constant across a volume of the first region 101 and the second region 102. In some other embodiments, the second region 102 is a partially magnetic region that is a graded region. A graded region is characterized by a nitrogen content that is graded across a dimension of the graded region and a saturation magnetization value that is graded across the dimension of the graded region.

As used herein, a parameter such as, for example, the nitrogen content or the saturation magnetization value, across a dimension of the second region 102 is considered to be graded if that parameter changes across the dimension of that region 102. Further, the term "change in a parameter", as used herein, is a measurable difference in the parameter using a commonly used device for measuring such a parameter. In some embodiments, the change in a parameter may be gradual, stepwise, or a combination thereof. In some embodiments, a nitrogen content in the second region 102 is graded in a substantially continuous manner across the dimension of the second region. As used herein, a change in a parameter is referred to be "substantially continuous manner across the dimension" if a line drawn using value of the parameter with respect to the position in the dimension has a constant, non-zero slope.

Referring back to FIG. 2, the second region 102 may be rendered non-magnetic or partially-magnetic by controlling the amount of nitrogen that diffuses into the second region 102. Further, for embodiments wherein the second region is graded, the gradation in the nitrogen content can be achieved by selectively controlling the amount of diffused nitrogen across a dimension of the second region 102. The amount of diffused nitrogen may be controlled by one or both of selectively varying the nitrogenation parameters and selectively varying the characteristics of the patterned oxide layer 130.

In certain embodiments, in order to obtain a partially-magnetic region, an oxide layer may be formed on that particular region similar to the magnetic region (e.g., first region 101), however, a characteristic of the oxide layer may be varied to achieve the desired nitrogen content. These characteristics of the oxide layer includes, but are not limited to, one or more of an oxide layer thickness, an oxide layer density, or a surface coverage area. The variation in these characteristics may be achieved by different methods. In some embodiments, for example, the variation in these characteristics may be attained by selectively etching the oxide layer after deposition to vary one of more of thickness, density or surface coverage area.

Figure 3:
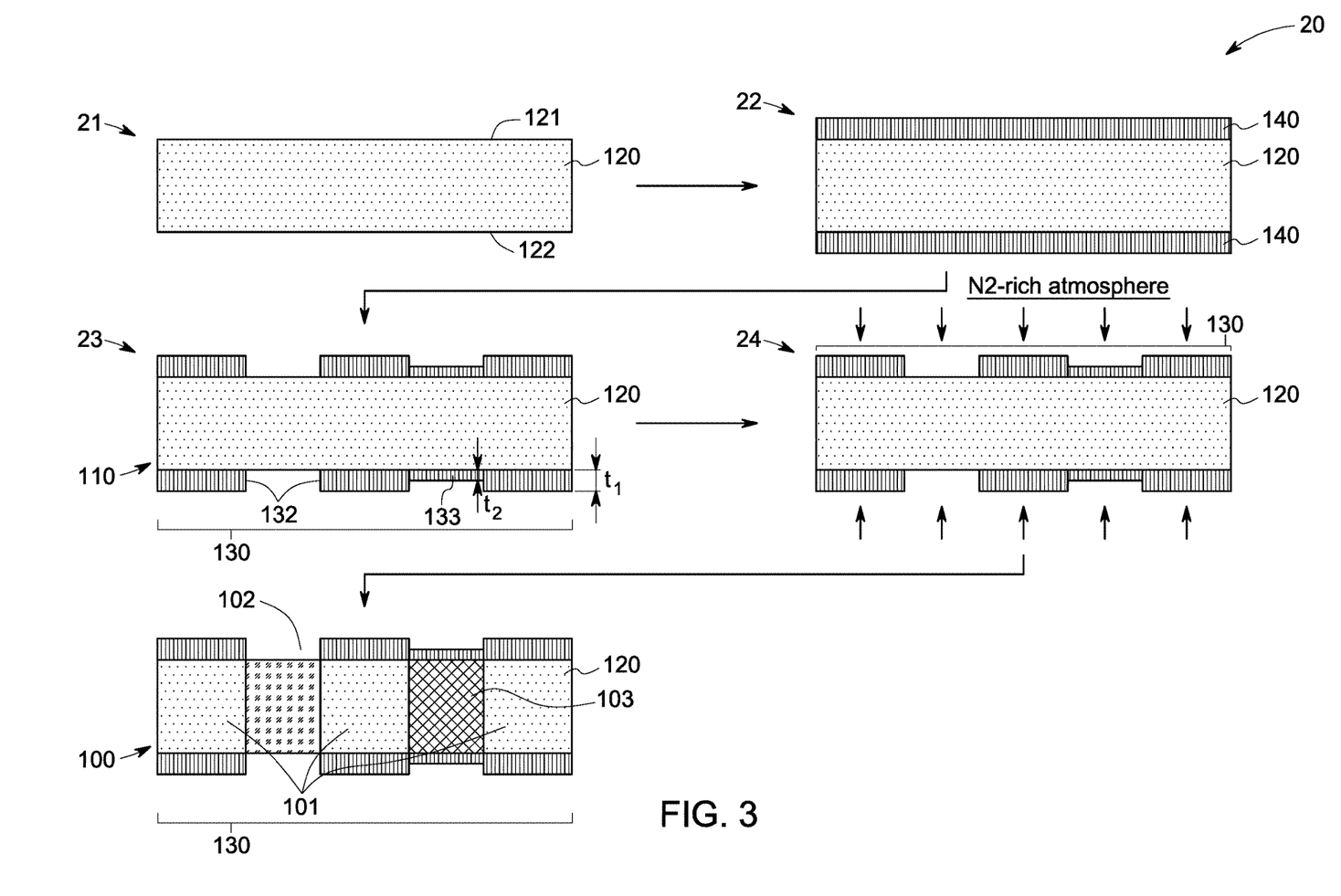
FIG. 3 illustrates side elevation views of a component having a variation in saturation magnetization being formed, via a sequence of steps, in accordance with some embodiments of a method of the disclosure.

Referring now to FIG. 3, side elevation views of a component 100 having a variation in saturation magnetization being formed, via a sequence of steps, in accordance with some embodiments of a method 20 of the disclosure, are illustrated. The method is similar to method described above with respect to FIG. 2, except that, at step 23, the oxide layer 140 is selectively etched such that it forms regions 132 of a thickness "t1" and regions 133 of a thickness "t2". In the embodiment illustrated in FIG. 3, the thickness "t2" is lower than thickness "t1". Therefore, during the nitrogenation step 24, the nitrogen content and the subsequent saturation magnetization in the first region 101, the second region 102, and the third region 103 can be varied. For example, after the nitrogenation step, the first region 101 may remain magnetic because of no or insignificant amount of nitrogen diffusion into the first region 101, the second region 102 may be rendered non-magnetic because of a sufficient amount of nitrogen diffusion into the second region 102, and the third region 103 may be rendered partially magnetic because of some amount of nitrogen diffusion through the oxide region 133, which may function as a partial barrier to nitrogen diffusion. Thus, the component 100 may include a magnetic region 101, a non-magnetic region 102 and a partially-magnetic region 103.

As discussed above, in some embodiments, instead of varying the thickness of the oxide region 133, a density or surface coating area percentage of the oxide region 133 may be varied to control the diffusion of the nitrogen. For example, an oxide region 133 having a lower density may allow some amount of nitrogen to diffuse through, as compared to a denser oxide region 132. Further, if a surface coverage area of the oxide region 133 is lower than a surface coverage area of the oxide region 132, some amount of nitrogen may diffuse into the third region 103. Similarly, a gradation in nitrogen content and the saturation magnetization values may be achieved.

Figure 4:
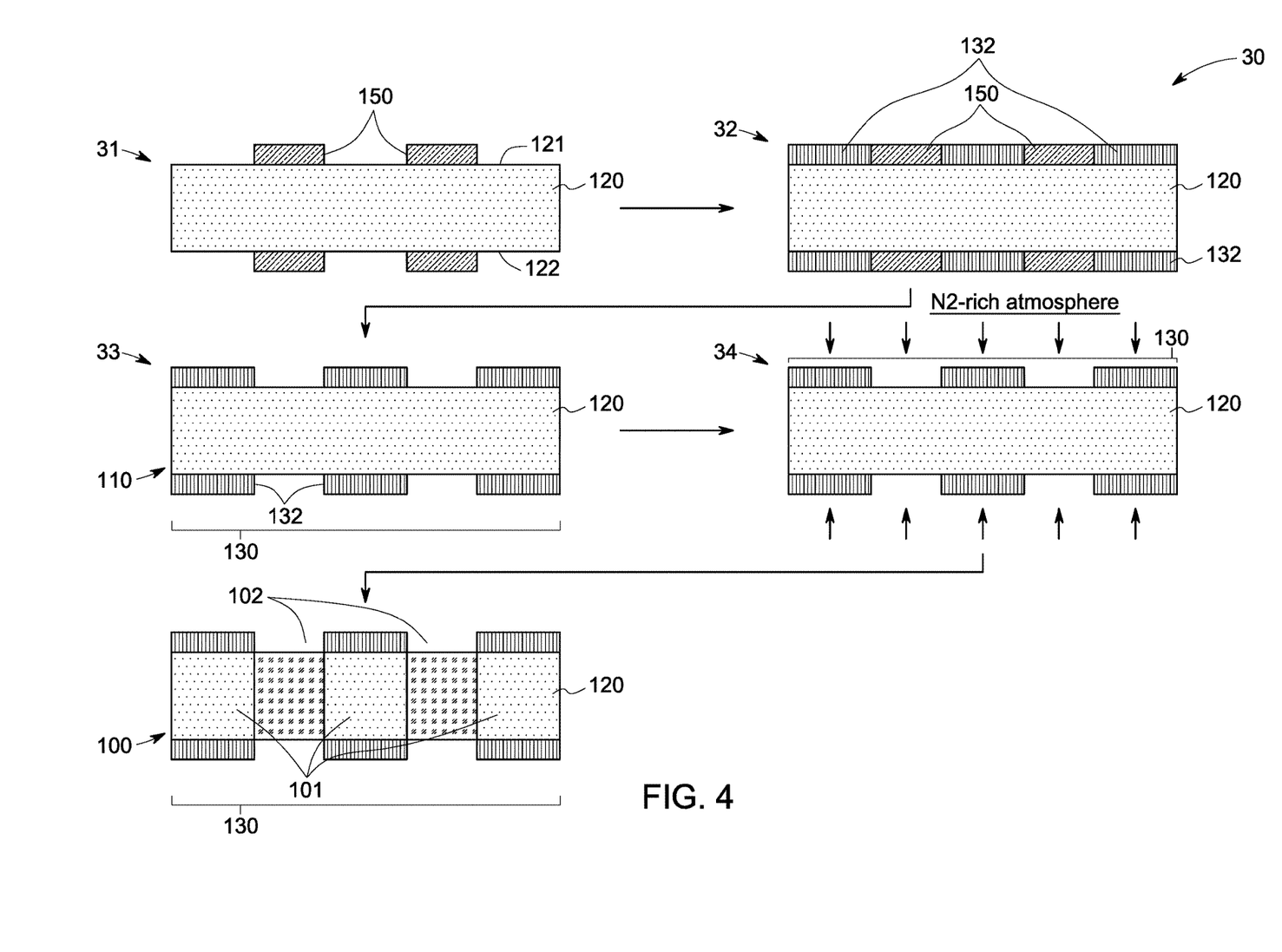
FIG. 4 illustrates side elevation views of a component having a variation in saturation magnetization being formed, via a sequence of steps, in accordance with some embodiments of a method of the disclosure.

Referring now to FIG. 4, side elevation views of a component 100 having a variation in saturation magnetization being formed, via a sequence of steps, in accordance with some embodiments of a method 30 of the disclosure, are illustrated. In the embodiment illustrated in FIG. 4, the patterned oxide layer 130 is formed by masking selected portions of metallic component 120 followed by selectively oxidizing the surfaces of the unmasked portions of the metallic component 120. As shown in FIG. 4, the method 30 includes at step 31, procuring or providing a metallic component 120 having a mask 150 disposed thereon. The method further includes, at step 32, forming oxide regions 132 on the exposed (that is, the unmasked) surfaces 121 and 122 of the metallic component 120. It should be noted that in FIG. 4, although the oxide regions 132 are shown only on surfaces 121 and 122 of the metallic component 120, embodiments wherein the oxide regions are grown on all the other surfaces (e.g., side faces) are also envisaged within the scope of the disclosure. As noted previously, the oxide regions 132 includes an oxide of the metal present in the metallic component 120. Non-limiting examples of suitable techniques for forming the oxide regions 132 include thermally treating the metallic component 120, chemically oxidizing the metallic component 120, or a combination thereof, described in detail earlier.

Referring again to FIG. 4, the method 30 further includes selectively removing the mask 150, at step 33, to form the patterned oxide layer 130. The patterned oxide layer 130 is formed on the metallic component 120 to form the masked metallic component 110, as shown in FIG. 4. The mask 150 may be selectively removed by different methods including, but not limited to, etching, grit blasting, and the like.

Further, in some embodiments, portions of the oxide regions 132 may also be removed, at step 33, to form the patterned oxide layer 130. As described in detail earlier, depending on whether one or both of a partially magnetic region or a graded region is desired in the component 100, the characteristics (e.g., thickness, density, or surface coverage area) of the oxide regions 132 may be further varied in some embodiments. Accordingly, at step 33, portions of the oxide regions 132 may be selectively removed by different methods including, but not limited to, etching, grit blasting, and the like. Appropriately designed stencils and/or masks may be used for additional selective patterning of the oxide regions 132.

With continued reference to FIG. 4, the method 30 further includes, at step 34, exposing the masked metallic component 110 to a nitrogen-rich atmosphere, thereby forming the component 100, as described earlier with reference to FIG. 2. The method 30 further includes, at step 34, forming a first region 101 and a second region 102 in the metallic component 120 to form the component 100. The first region 101 and the second region 102 are characterized by a nitrogen content that is different from each other and a saturation magnetization value that is different from each other.

In some embodiments, the methods 10, 20, and 30 illustrated in FIGS. 1-4 may further include incorporating the component 100 having a variation in saturation magnetization, into a component of an electrical machine, without removing the patterned oxide layer 130. For example, in embodiments, wherein the component 100 is laminated together to form a rotor or a stator, multiple components 100 may be laminated with each other such that the magnetic regions (i.e., first regions 101) of the components are axially aligned with each other. The patterned oxide layers 130 can remain on the components 100 during the lamination process, as these oxide layers are thin enough to not inhibit or interfere with the magnetism of the magnetic material in the first regions 101 of the components 100. Thus, the methods described herein may obviate the need for ceramic masks for selective nitrogenation, and related cumbersome deposition steps. In some other embodiments, the patterned oxide layer 130 may be completely or partially removed before incorporating the component 100 into a component of an electrical machine. In some such embodiments, the patterned oxide layer 130 may be removed using any suitable removal technique.

Figure 5:
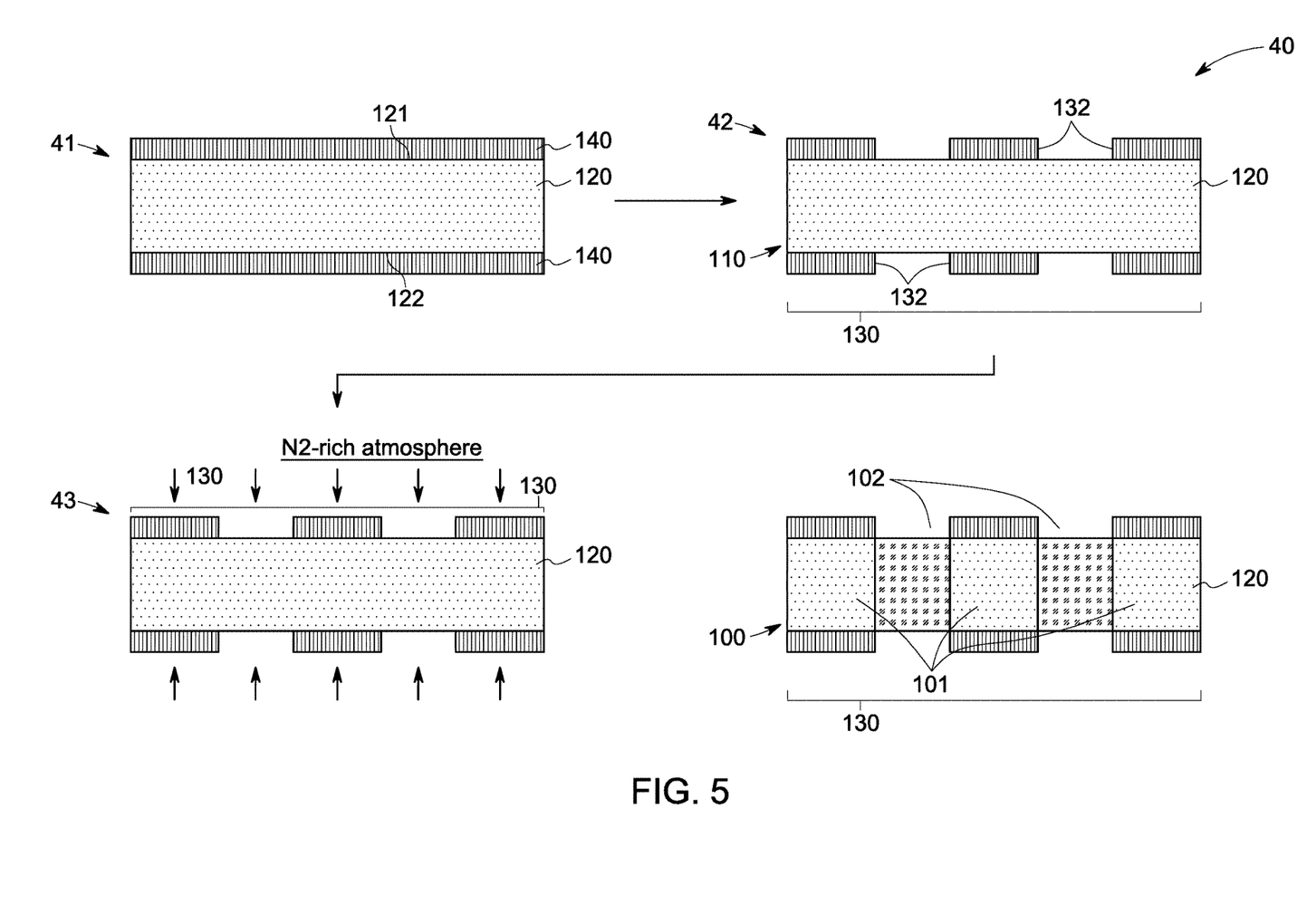
FIG. 5 illustrates side elevation views of a component having a variation in saturation magnetization being formed, via a sequence of steps, in accordance with some embodiments of a method of the disclosure.

In some embodiments, a method of forming a component is presented. The method 40 is described herein with reference to FIG. 5. FIG. 5 illustrates side elevation views of a component 100 having a variation in saturation magnetization being formed, via a sequence of steps, in accordance with some embodiments of a method 40 of the disclosure. The method 40, includes, at step 41, forming an oxide layer 140 on a surface 121, 122 of a metallic component 120. The oxide layer 440 includes an oxide of a metal present in the metallic component 120. The method 40 further includes, at step 42, patterning the oxide layer 140 to form a masked metallic component 110 including a patterned oxide layer 130. The method 40 further includes, at step 43, heat-treating the masked metallic component 110 in a nitrogen-rich atmosphere at a temperature greater than 700° C. to form the component 100. The component 110 includes a first region 110 and a second region 120, the first region 110 and the second region 120 characterized by a nitrogen content that is different from each other, and a saturation magnetization value that is different from each other. The oxide layer 140 may be formed, at step 41, by thermally treating the metallic component 110, chemically oxidizing the metallic component 110, or a combination thereof. In some embodiments, as described in detail earlier, the oxide layer 140 is formed by thermally treating the metallic component 110. In certain embodiments, the step 41 of forming the oxide layer 140 includes thermally treating the metallic component 110 at a temperature equal to or greater than 900° C. in the presence of an atmosphere including an oxidant.

Figure 6:
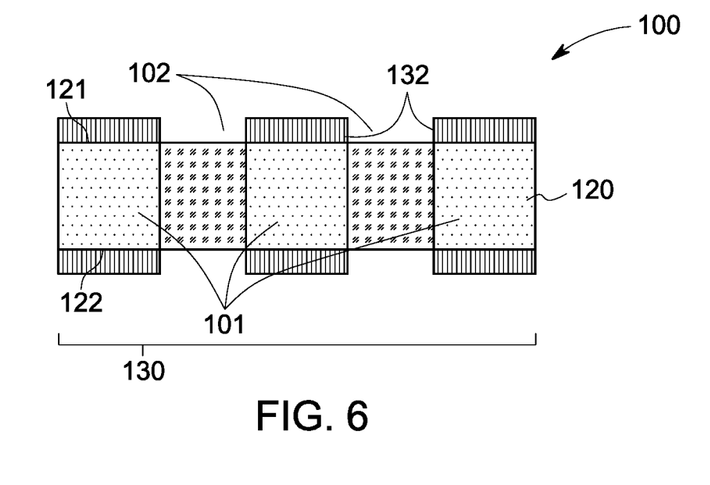
FIG. 6 is a side elevation view of a component having a variation in saturation magnetization, in accordance with some embodiments of the disclosure.
Figure 7:
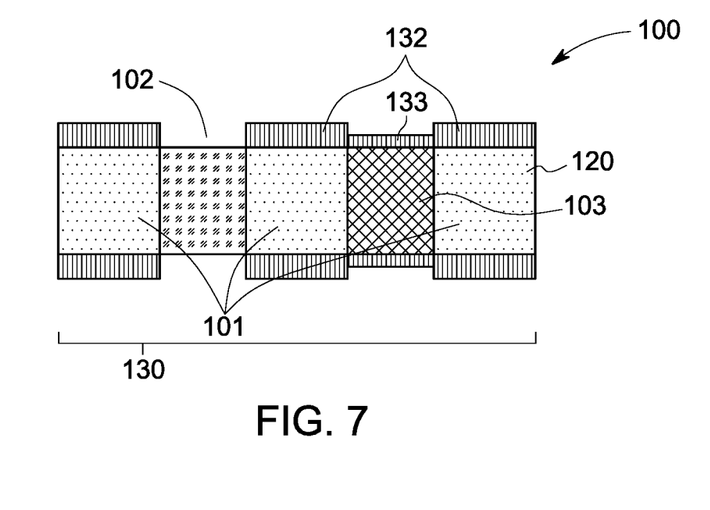
FIG. 7 is a side elevation view of a component having a variation in saturation magnetization, in accordance with some embodiments of the disclosure.

A component is also presented. Side elevation views of a component having a variation in saturation magnetization are illustrated in FIGS. 6 and 7. The component 100 includes a metallic component 120 and a patterned oxide layer 130 disposed on a surface 121, 122 of the metallic component 120. The patterned oxide layer 130 includes an oxide of a metal present in the metallic component 120. The component 100 is characterized by a variation in nitrogen content and a variation in saturation magnetization values in different regions of the metallic component 120.

In some embodiments, as shown in FIGS. 6 and 7, the metallic component includes a first region 101 and a second region 102, the first region 101 and the second region 102 characterized by a nitrogen content that is different from each other and a saturation magnetization value that is different from each other. In some embodiments, the first region 101 is magnetic and the second region 102 is non-magnetic or partially-magnetic. In such instances as shown in FIGS. 6 and 7, an oxide region 132 of the patterned oxide layer 130 is disposed on the first region 101.

In some embodiments, the first region 101 is magnetic and the second region 102 is partially-magnetic. In such instances, a nitrogen content of the first region 101 is less than 0.1 weight % of the first region 101, and a nitrogen content of the second region 102 is in the range from about 0.1 weight % to about 0.4 weight % of the second region 102. In some embodiments, the first region 101 is magnetic and the second region 102 is non-magnetic. In such instances, a nitrogen content of the first region 101 is less than 0.1 weight % of the first region 101, and a nitrogen content of the second region 102 is greater than 0.4 weight % of the second region 102.

With continued reference to FIGS. 6 and 7, in some embodiments, the second region 102 includes a graded region characterized by a nitrogen content that is graded across a dimension of the graded region, and a saturation magnetization value that is graded across the dimension of the second region 102. Further, in some embodiments, the third region 103 (shown in FIG. 7) includes a graded region characterized by a nitrogen content that is graded across a dimension of the graded region, and a saturation magnetization value that is graded across the dimension of the third region 103.

A component of an electrical machine including the component 100 is also presented. Non-limiting examples of suitable electrical machines include a motor, a generator, a transformer, a toroid, an inductor, and combinations thereof. In some embodiments, the component is a component of a motor or a generator, such as, for example, a rotor, a stator, or a combination thereof. In certain embodiments, the component 100 is a laminate or a portion of a laminate used in a stator or a rotor of motor.

Figure 8:
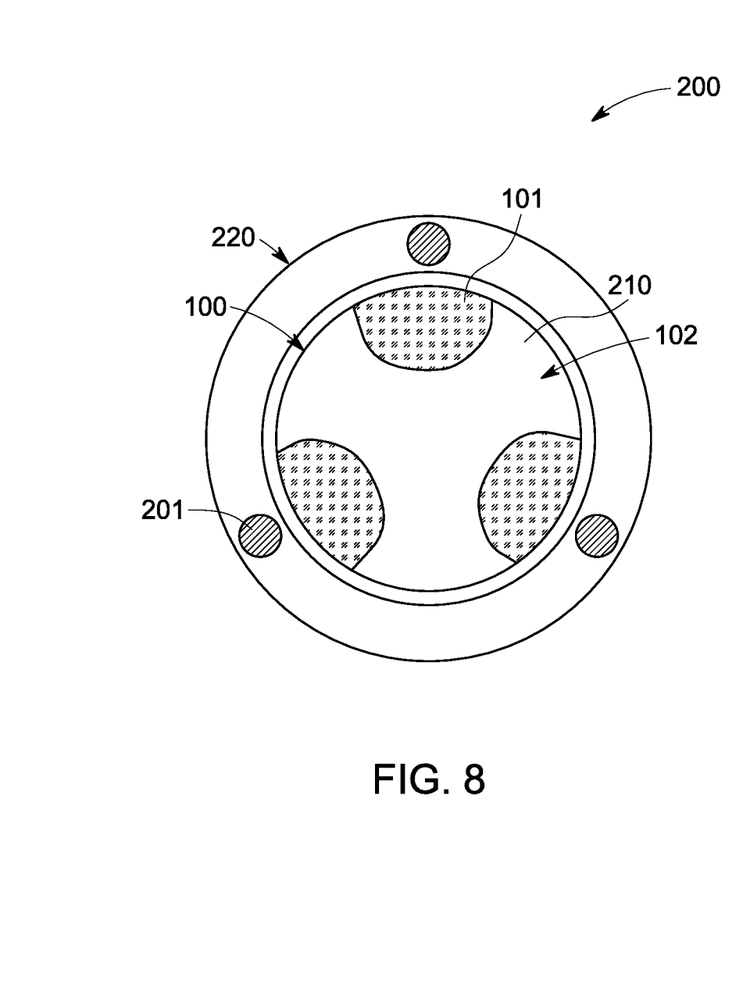
FIG. 8 is an end-view of a component of an electrical machine including a component having a variation in saturation magnetization, in accordance with some embodiments of the disclosure.
Figure 9:
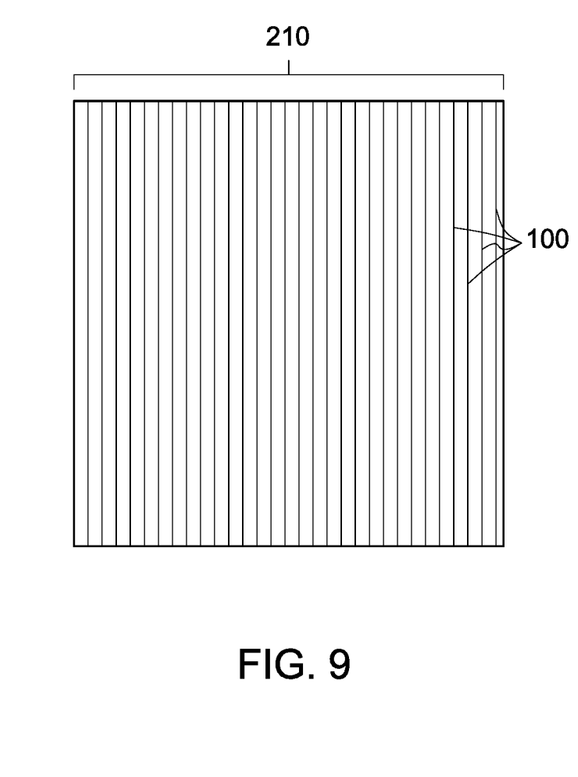
FIG. 9 schematically illustrates a side-view of a portion of the component having a variation in saturation magnetization shown in FIG. 8.

FIG. 8 illustrates an end-view of a component 210 of an electrical machine 200 including a component 100 having a variation in saturation magnetization, in accordance with some embodiments of the disclosure. In the illustrated embodiment, the illustrated electrical machine is an electric motor having a rotor 210 and a stator 220. Thus, the component 210 is a rotor of an electrical machine 200 in the illustrated embodiment. The rotor 210 may include a plurality of components 100 laminated to each other. Alternatively, the rotor 210 can be formed from a single component 100. FIG. 9 schematically illustrates a side-view of a portion of the component 210 (e.g., the rotor 210) shown in FIG. 8. As shown in FIG. 9, the components 100 are laminated together to form the rotor 210. The aspect ratio and direction of placement of the components 100 may be different from what is shown in FIG. 9.

The component 100 may have a plurality (e.g., three) magnetic poles formed by the magnetic portions 101. The remaining portions 102 of the component 100 may be non-magnetic or partially-magnetic. The stator 220 can include corresponding poles 201 that can be energized to be magnetic at different times and cause the rotor 210 to rotate within the stator 220.

Different embodiments presented herein may enable an electrical machine designer to precisely control the distribution of magnetic flux through the volume of an electrical machine. Presence of regions of differential saturation magnetization such as magnetic, partially-magnetic, and non-magnetic regions in a motor component may enable precise control of magnetic flux distribution through the volume of an electrical machine. The magnetic flux density within the machine may be highest in magnetic regions, lower in the partially-magnetic regions, and lowest in the non-magnetic regions. Additionally, partially-magnetic and non-magnetic regions may aid in securing the high saturation magnetization regions together and retaining the mechanical integrity of the machine during operation. Further, the presence of multiple regions of different saturation magnetizations distributed throughout the volume of the machine may enable a machine designer to control distribution of magnetic flux within the machine.

EXAMPLES

Example 1

An iron-alloy based coupon (0.25 mm thick) was solvent cleaned prior to oxidation. The coupon was exposed to an atmosphere containing air in a furnace at a temperature in a range from about 900° C. to about 1050° C. for a period of 1 to 3 hours. Half of the oxidized coupon was covered with a tape and the oxide coating from the other half was removed by grit blasting the coupon. The coupon was then exposed to a flow of $N_2$ gas at a temperature of about ~1100° C. for a period of 20 minutes. Saturation magnetization values after the nitrogenation step were measured in the different sections of the coupon. The portions covered with the oxide barrier layer (i.e., the portions that were protected by a tape during grit blasting) retained more than 96% of the original magnetizations after the nitrogenation step. The uncovered portions of the coupon (i.e., the portions with the oxide barrier layer removed) showed more than 95% reduction in magnetization, after the nitrogenation step.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:
1. A method of forming a component having a variation in saturation magnetization, comprising:
selectively diffusing nitrogen into a metallic component of a masked metallic component by exposing the masked metallic component to a nitrogen-rich atmosphere, wherein the masked metallic component comprises a patterned oxide layer formed on a surface of the metallic component, the patterned oxide layer comprising an oxide of a metal present in the metallic component.

2. The method of claim 1, further comprising:
forming an oxide layer on the surface of the metallic component, wherein the oxide layer comprises the oxide of the metal present in the metallic component; and
selectively patterning the oxide layer to form the masked metallic component comprising the patterned oxide layer.

3. The method of claim 2, wherein forming the oxide layer comprises thermally treating the metallic component, chemically oxidizing the metallic component, or a combination thereof.

4. The method of claim 2, wherein forming the oxide layer comprises thermally treating the metallic component at a temperature equal to or greater than 900° C. in a presence of an atmosphere comprising an oxidant.

5. The method of claim 4, wherein the atmosphere further comprises helium, argon, nitrogen, a nitrogen and hydrogen mixture, a hydrogen and steam mixture, or combinations thereof.

6. The method of claim 1, wherein exposing the masked metallic component to the nitrogen-rich atmosphere comprises heat-treating the masked metallic component in the nitrogen-rich atmosphere at a temperature greater than 700° C.

7. The method of claim 1, wherein selectively diffusing nitrogen into the metallic component results in formation of a first region and a second region in the metallic component, the first region and the second region characterized by a nitrogen content that is different from each other and a saturation magnetization value that is different from each other.

8. The method of claim 7, wherein the first region is magnetic and the second region is non-magnetic or partially-magnetic.

9. The method of claim 7, wherein the second region is a graded region characterized by a nitrogen content that is graded across a dimension of the graded region and a saturation magnetization value that is graded across the dimension of the graded region.

10. The method of claim 1, further comprising incorporating the component having the variation in saturation magnetization into a component of an electrical machine, without removing the patterned oxide layer.

11. A method of forming a component having a variation in saturation magnetization, comprising:
forming an oxide layer on a surface of a metallic component, wherein the oxide layer comprises an oxide of a metal present in the metallic component;
patterning the oxide layer to form a masked metallic component comprising a patterned oxide layer; and
heat-treating the masked metallic component in a nitrogen-rich atmosphere to form a first region and second region in the metallic component, wherein the first region and the second region are characterized by a nitrogen content that is different from each other, and a saturation magnetization value that is different from each other.

12. The method of claim 11, wherein forming the oxide layer comprises thermally treating the metallic component, chemically oxidizing the metallic component, or a combination thereof.

13. The method of claim 11, wherein forming the oxide layer comprises thermally treating the metallic component at a temperature equal to or greater than 900° C. in a presence of an atmosphere comprising an oxidant.

14. A method comprising:
selectively diffusing nitrogen into a metallic component having an oxide layer by exposing the metallic component to a nitrogen-containing atmosphere, the metallic component comprising an oxide layer formed on less than an entirety of a surface of the metallic component, the oxide layer comprising an oxide of a metal in the metallic component.

15. The method of claim 14, further comprising:
forming the oxide layer on the entirety of the surface of the metallic component; and
patterning the oxide layer to expose part of the metallic component.

16. The method of claim 15, wherein the oxide layer is formed by one or more of heating the metallic component or chemically oxidizing the metallic component.

17. The method of claim 15, wherein the oxide layer is formed by thermally treating the metallic component at a temperature equal to or greater than 900° C. in an oxygen-comprising atmosphere.

18. The method of claim 17, wherein the oxygen-comprising atmosphere further comprises one or more of helium, argon, nitrogen, a mixture of nitrogen and hydrogen, or a mixture of hydrogen and steam mixture.

19. The method of claim 14, wherein the metallic component is exposed to the nitrogen-containing atmosphere by heat-treating the metallic component in the nitrogen-containing atmosphere at a temperature greater than 700° C.

20. The method of claim 14, wherein selectively diffusing nitrogen into the metallic component forms a first region and a second region in the metallic component, the first region having a different nitrogen content than the second region and a different saturation magnetization value than the second region.

* * * * *